United States Patent [19]

Macklin et al.

[11] Patent Number: 4,498,182
[45] Date of Patent: Feb. 5, 1985

[54] CONTINUOUS WAVE SPER LASER

[75] Inventors: John J. Macklin, Highlands; William T. Silfvast, Holmdel, both of N.J.; Obert R. Wood, II, New York, N.Y.

[73] Assignee: AT&T Bell Laboratories, Murray Hill, N.J.

[21] Appl. No.: 389,779

[22] Filed: Jun. 18, 1982

[51] Int. Cl.³ .............................................. H01S 3/03
[52] U.S. Cl. ...................................... 372/62; 372/56; 372/76; 372/81; 372/92
[58] Field of Search .................... 378/87, 86, 55, 62, 378/56, 76; 372/92, 81

[56] References Cited

U.S. PATENT DOCUMENTS 4,336,506  6/1982  Silfvast et al. ........................ 378/87

Primary Examiner—William L. Sikes
Assistant Examiner—Leon Scott, Jr.
Attorney, Agent, or Firm—Michael J. Urbano

[57] ABSTRACT

Continuous wave laser oscillation has been achieved in a segmented plasma excitation and recombination device in the presence of a low-pressure background gas which rapidly flows across the segmented electrodes. Laser action has been observed in Cd I at 1.40, 1.43, 1.44, and 1.64 μm. Also disclosed are techniques for allowing the background gas to flow between the electrodes and for confining the expanding plasmas with shields in the vicinity of the gaps between electrodes.

11 Claims, 6 Drawing Figures

CONTINUOUS WAVE SPER LASER

CROSS-REFERENCE TO RELATED APPLICATIONS

This application is being concurrently filed with J. J. Macklin-W. T. Silfvast-O.R. Wood II, Ser. No. 389,780, entitled "SPER Device for Material Working."

BACKGROUND OF THE INVENTION

This invention relates to continuous wave operation of plasma excitation and recombination lasers.

In *Applied Physics Letters,* Vol. 36, No. 8, page 615 (1980), W. T. Silfvast, L. H. Szeto and O. R. Wood II describe a new electric discharge device developed for producing laser action in the atomic spectra of a number of metal vapors by a segmented plasma excitation and recombination (SPER) mechanism. This laser includes a number of narrow metal strips (of the lasing species) positioned end-to-end on an insulating substrate in such a way as to leave a small gap between each pair of adjacent strips. The strips are positioned in a laser cavity containing either a buffer gas (preferably) or a vacuum and typically are 1 mm thick, 2 mm wide, and 10 mm long (hereinafter "bulk electrodes"). When a high-voltage, high-current pulse is applied to the end strips of this arrangement, a high-density metal-vapor ion plasma is formed in each gap. Once formed, these plasmas (consisting primarily of vaporized strip material) expand hemispherically, cool in the presence of the background gas (e.g., helium) at low pressure and recombine. Using this laser configuration, pulsed laser action was observed in the near infrared at more than seventy wavelengths between 0.29 and 3.95 μm in 11 elements (Ag, Bi, C, Ca, Cd, Cu, In, Mg, Pb, Sn, Zn), 3 of which (Mg, Zn, In) had not been observed to oscillate in their neutral spectrum before. Some of these results are reported in the aforementioned APL article; others are reported by W. T. Silfvast et al in *Applied Physics Letters,* Vol. 39, No. 3, page 212 (1981) and in *Optics Letters,* Vol. 7, No. 1, page 34 (1982).

The SPER laser is simple to construct, can be easily scaled in length and volume, has been shown to be capable of long life, and has the potential for high efficiency. It is the subject matter of copending applications Ser. Nos. 82,308 and 367,092, filed on Oct. 5, 1979 and Apr. 9, 1982, now U.S. Pat. Nos. 4,336,506 and 4,395,770 respectively. Both patents are assigned to the assignee hereof.

Lasing action in a SPER laser is not observed with equal facility with all metals, even at high pressure of the background gas. A figure of merit, M ($0 < M \leq 1$), can be derived which defines the relative ease of achieving lasing action in a metal vapor. M is defined as follows:

$$M = 1/kc\rho T^2 \quad (1)$$

where k is the thermal conductivity of the metal, c is the specific heat of the metal, $\rho$ is the density of the metal, and T is the absolute temperature of the surface of the metal electrode. Experimentally, metals with $M \sim 1$, such as Cd and Na, have been found to easily produce segmented metal vapor plasmas necessary for lasing action in SPER lasers at low background gas pressures (e.g., 1-10 Torr), whereas metals with $M << 1$, such as Li, Al, Ca, and Cu, do not even produce segmented plasmas. With these metals as the background, the pressure is reduced, the discharge current is carried by a discharge in the background gas between non-adjacent electrodes, effectively shorting out the intervening metal-vapor arcs, reducing the number of metal vapor plasmas and, hence, lowering the net gain.

In another copending application Ser. No. 367,216 also filed on Apr. 9, 1982, now U.S. Pat. No. 4,441,189, and assigned to the assignee hereof, we describe how segmented metal vapor plasma discharges and pulsed lasing action in SPER devices can be achieved, even at relatively low background gas pressures, with metal electrodes of materials having $M << 1$ provided that the metal strips constitute foil electrodes. These electrodes are sufficiently thinner (typically about 10 times thinner) than bulk electrodes so that discharges occur only between adjacent electrodes, thereby eliminating the short circuiting problem associated with bulk electrodes. Using this foil electrode SPER configuration, we have achieved pulsed laser action in four metals (Li, Al, Ca, and Cu) in which laser oscillation was not possible using bulk electrodes and low pressures. As a result, we observed recombination laser action on 30 transitions with oscillating wavelengths ranging from 569.6 nm to 5460 nm. Twenty-eight of these transitions had not previously been made to undergo laser oscillation by any excitation means. In addition, we observed segmented vapor plasma discharges in a SPER device with Ni foil electrodes.

In all of our prior work, however, the SPER lasers were operated in a pulsed mode; that is, the excitation means applied a relatively short duration (e.g., 5 msec) electrical pulse. Significantly longer duration electrical signals suitable for continuous wave operation would have generated excessive heat in the electrodes, ultimately causing them to melt. Had the electrodes been so damaged, of course, laser operation would no longer have been possible.

SUMMARY OF THE INVENTION

In accordance with our invention, a continuous wave SPER laser includes at least two electrode strips arranged in tandem, the strips having at least one gap therebetween which provides at least one intervening discharge path; means for applying an electrical pump signal to the strips; at least a portion of the strips being fabricated from a material which is converted into a plasma as a result of the application of the pump signal, which plasma cools and recombines to generate laser radiation, characterized in that the pump signal is suitable for continuous wave operation and means are provided for flowing a background gas across the electrodes.

Using this laser configuration with Cd strips, continuous wave laser action has been observed for the first time in an arc discharge plasma. Laser action occurred in the Cd vapor, at 1.40, 1.43, 1.44, and at 1.64 μm, as the Cd+ ions recombined in the presence of a flowing He background gas. Typical input powers of 3-4 A at 20 V produced a measured power output of 0.5 mW, although the laser was believed to be operating near threshold and significantly higher powers should be possible. This technique is applicable to a wide range of visible and infrared recombination laser transitions already achieved in pulsed metal vapor arc plasmas and may also be extended to ion lasers, thereby producing visible and possibly ultraviolet laser outputs.

BRIEF DESCRIPTION OF THE DRAWING

Our invention, together with its various features and advantages, can be readily understood from the following, more detailed description taken in conjuction with the accompanying drawing, in which.

DETAILED DESCRIPTION

Figure 1:
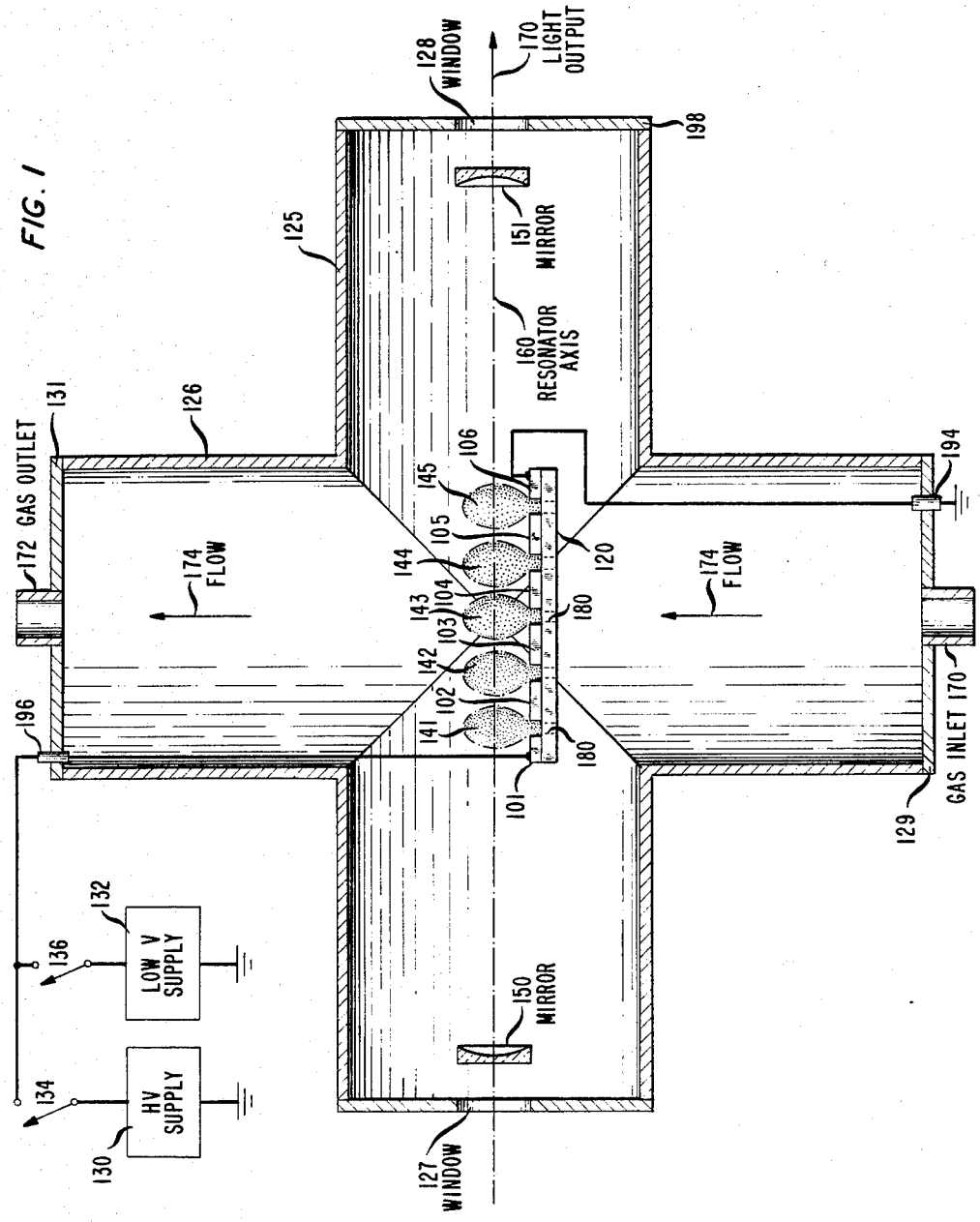
FIG. 1 is a schematic of an illustrative embodiment of a continuous wave SPER laser in accordance with our invention.

An illustrative embodiment of the present invention used for continuous wave operation of a SPER laser in a metal vapor is shown in FIG. 1. A plurality of metal strip electrodes 101–106 are positioned in tandem on an electrically insulating substrate 120 in such a manner as to leave a small gap between each pair of adjacent strips. This electrode arrangement is then installed in a T-shaped gas cell comprising a longitudinal tube 125 and a transverse tube 126. A high voltage supply 130 and a low voltage supply 132 are connectable in series across the first (101) and last (106) electrodes via switches 134 and 136, respectively. The high voltage supply typically provides a high voltage pulse (e.g., a few kV at 20–50 mA for ∼1 msec) to pre-ionize the gaps, after which low voltage supply 132 provides a lower voltage signal (e.g., a few tens of volts at 3–8 A) suitable for continuous wave operation. In general, a signal which is longer in duration than a few milliseconds would be suitable for continuous wave operation. For operation longer than about 1 sec, well-known cooling means (not shown) should be incorporated to prevent the electrodes from overheating and melting. This excitation produces a bright metal vapor plasma in each gap. Areas 141–145 in FIG. 1 depict the shape of the plasmas after they have expanded essentially hemispherically outward from the gaps into a background gas.

The entirety of each strip need not constitute a material which is vaporizable into a plasma. As described in our copending applications Ser. Nos. 367,092 and 367,216, it is sufficient if the cathode ends constitute such a material and that the anode ends constitute a nonvaporizable material under the operating condition of the device. Moreover, strips of different vaporizable materials can be mixed within a single device so as to yield a multi-color source.

Two dielectric spherical mirrors 150 and 151 are coated for maximum reflectivity at the desired lasing wavelength to form a resonator for the laser radiation. Illustratively, these mirrors are mounted near the ends of longitudinal tube 125 which contain windows 127 and 128. The optical axis 160 of this resonator is positioned parallel to and slightly above the row of electrodes. The output from this resonator, shown as arrow 170, is focused through suitable filters onto a suitable photodetector (not shown).

Insulating substrate 120 is not essential to operation of the laser. In fact, substrate 120 can be eliminated without significantly affecting the laser output. It does, however, function as a structural support for the electrodes and can control the direction of plasma expansion to some extent. Illustratively, substrate 120 is mounted on a rod (not shown) which is translatably mounted through end plate 129 at one end of transverse tube 126 so as to allow positioning of the electrodes relative to axis 160.

A gas inlet 170 and a gas outlet 172 are provided in end plates 129 and 131, respectively, at opposite ends of transverse tube 126. Background gas, such as helium, is coupled from a source (not shown) through inlet 170 and is made to flow relatively rapidly (e.g., 500 l/min) across electrodes 101–106 to outlet 172 and then to a gas pump (not shown). Arrows 174 show an illustrative direction of gas flow (e.g., transverse to resonator axis 160) which acts to cool the electrodes and allows for continuous wave operation. In general, the direction of gas flow should be chosen so as to move the metal ions in the plasma away from the arc discharges in the regions of the gaps. To this end, the gas flow should at least be in the vicinity of the gaps.

To enhance this effect it may be desirable to provide apertures 180 (e.g., slots) in substrate 120 between the electrodes; i.e., in the gaps. Background gas would thus flow not only around substrate 120 but also through it, thereby increasing the cooling interaction of the gas and the electrodes.

Figure 5:
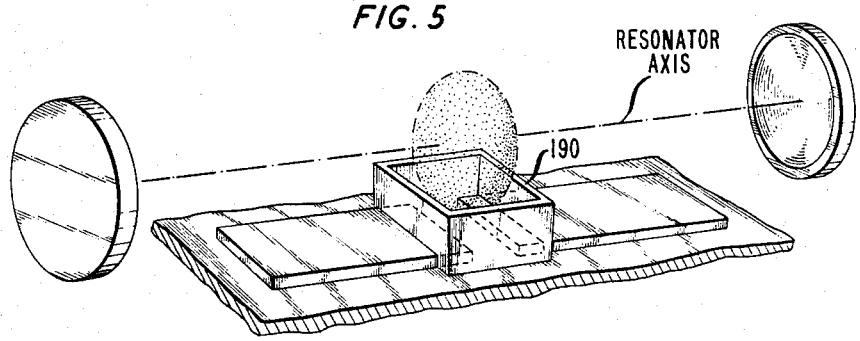
FIGS. 5 and 6 show two illustrative embodiments of means in the vicinity of the electrode gaps for containing the plasmas.
Figure 6:
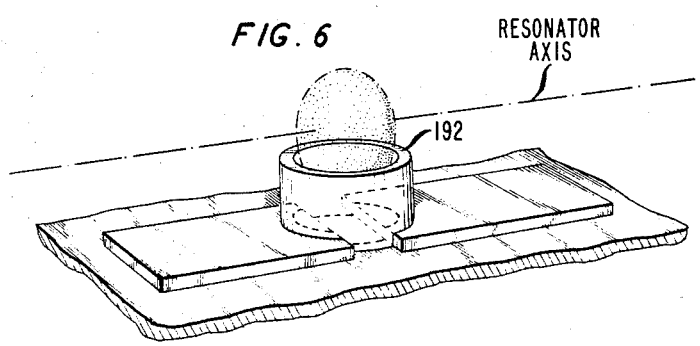

Another alternative embodiment of our invention is to provide, as shown in FIGS. 5 and 6, means for containing the plasmas comprising at least one electrically insulating wall in the vicinity of each gap. In FIG. 5 four such walls form a rectangular box 190 surrounding the bottom of each plasma; in FIG. 6 a single wall forms a cylinder 192. The function of the containing means is three-fold; first to reduce the likelihood that particulates from the plasma are deposited on the laser mirrors by blocking line-of-sight paths from each gap to each mirror; second, to confine each plasma, thereby keeping it hotter and improving efficiency; and third, to electrically isolate adjacent arcs.

The following example describes the structure and continuous wave operation of a Cd SPER laser. Dimensions, materials, and operating parameters are described by way of illustration only and, unless otherwise stated, are not intended to limit the scope of the invention.

EXAMPLE

The experimental arrangement of our continuous Cd SPER laser is basically shown in FIG. 1, except that only two Cd strip electrodes were used. The gas cell comprised a cross-shaped glass tube (10 cm i.d., 35 cm long), with internal, adjustable mounts for mirrors 150–151 at the opposing ends of longitudinal tube 125. The two opposing ends of transverse tube 126 provided electrical feed-throughs 194–196, a gas pressure inlet 170 and a pumping outlet 172. The two Cd metal electrodes, made from 5 mm o.d. half-cylindrical Cd rod of 99.9% purity, were mounted with the flat side on an insulating substrate 120. The substrate was connected to an adjustable rod (not shown) which extended through end plate 129 and allowed the position, x, of the electrodes to be varied with respect to the resonator axis 160. Helium gas was allowed to flow through the cell at the maximum pump speed, using a 500 liter per minute vacuum pump connected to the cell with a 2 cm i.d.

vacuum hose. The two Cd strip electrodes were rounded at the ends and mounted on the substrate 120 with a 1.5-2 mm gap between them. The arc was initiated with a high-voltage pulse from supply 130 to pre-ionize the gap region thereby allowing the arc to strike. The duration of the low-voltage arc operation was controlled by a timing circuit in supply 132 allowing temporal current variations to be studied to within accuracies of 1 ms. The He pressure was measured in the central region of the cell while the gas was flowing. The laser mirrors comprised 1 inch diameter, 2 meter radius of curvature dielectric coated mirrors installed in the mirror mounts at a separation of 22 cm. The output was coupled through a quartz window 128 mounted in the metallic and plate 198 fitted to one end of transverse tube 125.

Laser action was investigated primarily upon the 6p3P-6s3S transitions in Cd I occurring at 1.40, 1.43 and 1.44 $\mu$m. However, the 4f3F-5d3D transition at 1.64 $\mu$m was also observed to undergo continuous wave laser action. All of these transitions have been previously observed to exhibit recombination laser action in a pulsed expanding plasma SPER-type laser device. The principal studies described herein were made on the strongest transition at 1.43 $\mu$m.

Optimum laser output occurred at a He pressure of 5 Torr and, unlike prior art quasi-cw arc jet lasers requiring many kA of current, the optimum current was 4-6 A. Under these conditions, a laser output of 0.5 mW was measured using a highly-reflecting mirror 150 at one end and a 1% transmission output coupler mirror 151 at the other end of the resonator. The optimum height, x, from the bottom of the electrodes to the resonator axis 160 was x=10 mm. However, laser action was observed to occur over a range of from x=6 mm to 20 mm. In addition, the pressure variation over which laser action occurred ranged from 3 Torr to 10 Torr. The typical arc voltage drop ranged from 20 V at a current of 3 A to 15 V at a current of 8 A. At the optimum pressure of 5 Torr, the mass flow velocity of Cd vapor was measured to be about 2-3 cm/ms at a distance of 1-2 cm from the substrate 120. In general, it is desirable for the metal vapor mass flow to be at least this high to achieve continuous wave operation.

Figure 2:
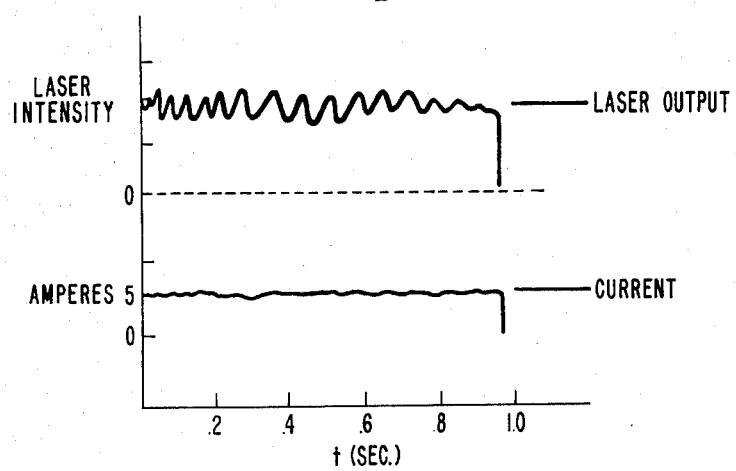
FIG. 2 is a graph showing an illustrative pump signal suitable for demonstrating continuous wave operation and the resulting laser light output.

FIG. 2 shows the continuous wave output of the laser operating for a duration of approximately one second. Operation for times longer than about 1 sec should include provision for better electrode cooling due to the relatively low melting point of Cd metal (320° C.).

Figure 3:
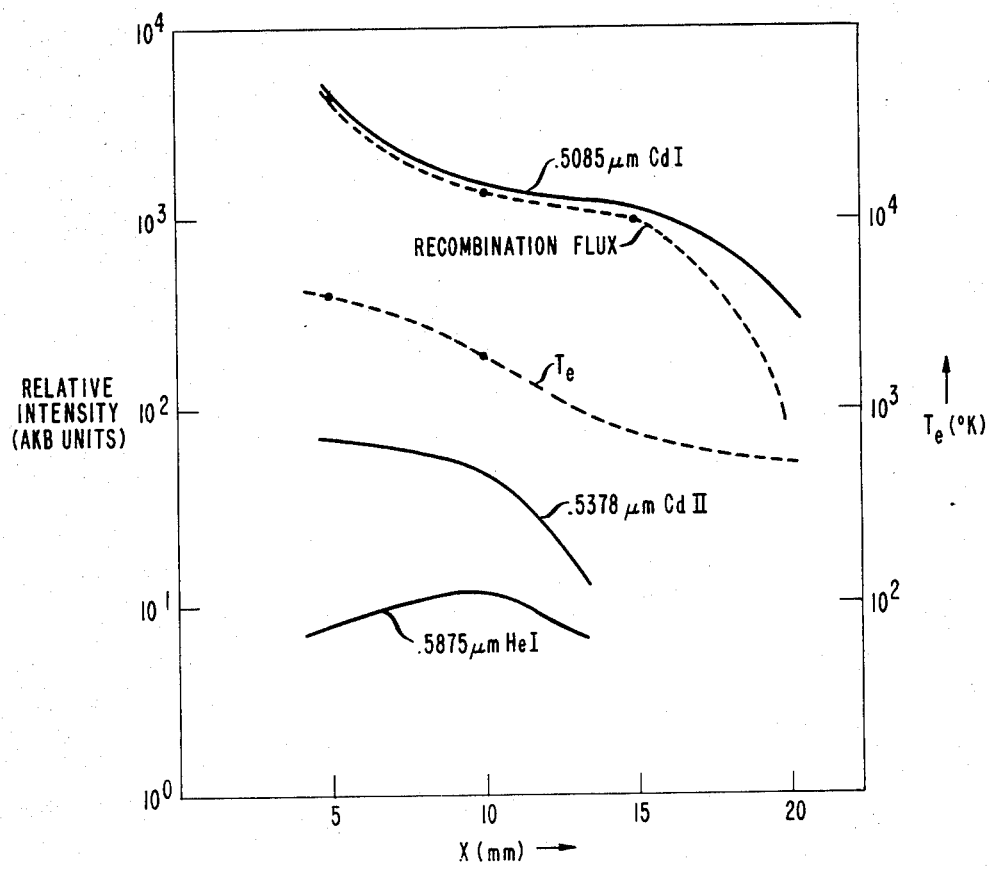
FIG. 3 is a graph of relative light intensity for various plasmas versus the distance x of the electrode strips from the resonator axis.

The appearance of the continuous wave arc consisted of a bright core approximately 5 mm in diameter located in and above the electrode gap region and a weaker emitting hemisphere approximately 2 cm in extent. Measurements of the variation of emission intensities and populations of various species in the arc plasma were made as a function of distance from the substrate measured normal to the plane of the substrate. FIG. 3 shows the emission of an excited neutral line at 0.5085 $\mu$m, an excited Cd ion line at 0.5378 $\mu$m, and an excited neutral He line at 0.5875 $\mu$m. The curved labled $T_e$ shows the variation of electron temperature with x. It can be seen that the Cd I transition clearly dominates over the Cd II and He I transitions which are significantly higher in energy than the Cd I transition, suggesting that the arc electron temperature is relatively low. This result is not inconsistent with other measurements of arc temperatures which have suggested that temperatures in the range of 5000° K. are typical.

Figure 4:
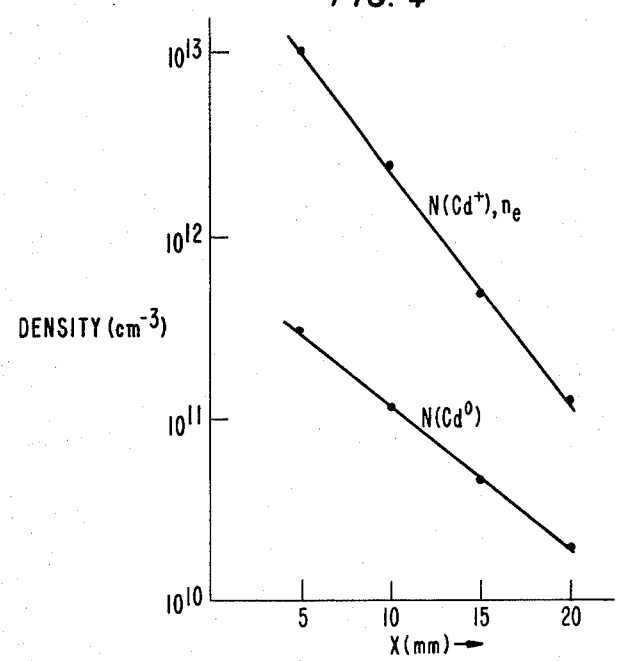
FIG. 4 is a graph showing the variation of the density of the neutral and ion Cd species as a function of x.

FIG. 4 shows the variation of Cd neutral and Cd ion species as a function of distance x from the substrate 120. The measurements were made by transmitting the emission from a He-Cd discharge through the arc plasma and measuring the absorption on transitions that terminate on the ground-state of these species. Since the results of FIG. 3 suggest a relatively low electron temperature, it can be argued that the Cd ion density of FIG. 4, $N(Cd^+)$, is the same as the electron density, $n_e$. The decrease in both $N(Cd^+)$ and $n_3$ with x can be explained primarily by a three dimensional hemispherical expansion of those species. This is consistent with the fact that the decrease in $N(Cd^+)$ and $n_e$ due to recombination can be shown to be negligible over the range of x of FIG. 2 for the flow velocities available in this experiment.

A steady-state model was developed to describe the population of the upper laser level as a function of distance from the substrate 120. Two excitation mechanisms were considered. The first was electron collisional excitation from lower lying levels, but primarily from the neutral ground-state. It was found that electron excitation rates to the upper laser level, or even to a collection of levels above the upper laser level, followed by cascade, was not sufficient to explain the relatively high gain of 0.0025 cm$^{-1}$ for the measured $n_e$ and relatively low electron temperature $T_e$ implied by the data of FIG. 3. The second excitation mechanism, recombination to the upper laser level from the Cd$^+$ ground state, combined with radiative decay, gave results more consistent with the experimental results. Using published recombination rates and fitting the measured gain observed at x=10 mm, and also fitting the variation of emission of the highly excited Cd neutral state emitting at 0.5085 $\mu$m (the emission should be comparable to that of the upper laser level), a variation of $T_e$ with x was obtained as shown in FIG. 3. This result indicates a $T_e$ of 4000° K. at x=5 mm which drops to a value of 500° K. at x=20 mm. Such a drop is not unrealistic when it is considered that each electron and Cd ion has approximately 10$^3$ He atoms with which to interact and cool during the expansion and that sufficient time is available to do this since it takes 300-500 $\mu$s for the ions to move from the cathode surface, where they are formed, to a position 10 mm from the substrate, the location of optimum gain. Calculated hydrogen recombination rates were used in the model since those for Cd are not available. It is expected, however, that the use of Cd rates, if they were known, would shift the temperature up by only a small amount since it is expected that recombination rates for Cd would be slightly larger than those for hydrogen.

Therefore, it appears that recombination is responsible for the excitation of the continuous wave Cd SPER laser. The ions are probably formed primarily in the cathode spot regions, which are typically 10 $\mu$m regions of intense vaporization and emission located directly in front of the cathode surface. Such spots have been extensively studied. However, their exact properties are still not completely understood. It has been suggested that a high field region exists in the spots where significant ionization of the vaporized electrode material takes place. The more energetic ions are propelled outward from the spot and the less energetic ones are returned to the cathode to further heat the cathode surface and produce more vaporization. Such a model would be consistent with observations of emission in the present work in which the bright emission regions, other than the localized region at the cathode surface, would be due primarily to recombination (the excitation and ionization having occurred near the cathode surface in the cathode spot regions). Laser action is not expected to occur at x=5 mm or lower since the electron density nearer the cathode exceeds the upper limit above which laser action could occur on this transition due to electron collisional equilibration of the upper and lower laser levels.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

Although Cd is the only metal in which cw arc lasers were attempted, it is expected that most of the 61 neutral transitions in 13 metals, ranging in wavelength from 0.941 μm to 5.46 μm, disclosed in our copending applications and published papers to undergo pulsed recombination laser action in a SPER-type plasma arc device, should be capable of continuous wave laser output in a configuration of the type disclosed herein. Extension to transitions in ions, producing visible and even ultraviolet lasers, might also be possible. However, it would be desirable to raise the arc temperature to produce significant populations of double and triple ions from which single and double ion recombination lasers would originate.

Improvements in our continuous wave SPER laser include utilization of more than two electrodes (i.e., a plurality of arcs) as in FIG. 1 to increase the gain and output power. In addition, techniques such as the use of confinement plates of FIGS. 5 and 6 and magnetic fields to prevent the electron density from dropping much below the upper limit, should improve the efficiency of the laser and increase the power output.

Finally, although the data provided above was taken from a Cd SPER laser in which the substrate did not contain apertures for the background gas to flow or be forced through, we also did experiments and demonstrated continuous wave operation with an apertured substrate. In the latter case, the plasma tended to extend much farther from the resonator axis, e.g., as far as 20 cm toward end plate 131. This embodiment has implications for metal deposition as discussed in the application concurrently filed herewith.

What is claimed is:

1. A recombination laser comprising:
a resonant laser cavity which permits egress of lasing radiation therefrom,
excitation means for producing said lasing radiation in said resonant laser cavity;
said excitation means comprising at least two conductor strips having at least one gap, which at least one gap provides at least one intervening discharge path; and means for applying an electrical signal to said at least two conductor strips; and
a cell for containing a background gas and in which said at least two strips are located;
at least a portion of said at least two conductor strips being fabricated from a material which is converted into a plasma of ions as a result of the application of said electrical signal, which plasma cools and recombines to generate said lasing radiation; characterized in that
said applying means preionizes said at least one gap and applies an electrical signal of at least a few milliseconds duration for producing continuous wave operation of said laser, and
means are provided for causing said background gas to flow across said at least two strips.

2. The laser of claim 1 wherein said gas flow means causes said gas to flow at least in the vicinity of said at least one gap.

3. The laser of claim 2 wherein said gas flow means causes said ions to flow away from said at least one gap at a rate of at least about 2–3 cm/ms.

4. The laser of claim 1 wherein
said cavity has an axis,
said at least two strips are arranged in tandem essentially parallel to said axis, and
said causing means causes said gas to flow transverse to said axis.

5. The laser of claim 4 further including
a substrate upon which said at least two strips are mounted, said substrate having at least one aperture through which said gas flows.

6. The laser of claim 5 wherein said at least one aperture is positioned in said at least one gap.

7. The laser of claim 4 wherein said portion comprises Cd and the distance between said axis and said at least two strips is in the range of approximately 6 to 20 mm.

8. The laser of claims 1, 2, 3 or 4 wherein said portion comprises Cd and said radiation has a wavelength of approximately 1.40, 1.43, 1.44 or 1.64 μm.

9. The laser of claim 1 further including electrically insulating wall means in the vicinity of said at least one gap for containing said plasma.

10. The laser of claim 1 wherein said applying means includes
first means for applying a high voltage pulse to preionize said at least one gap, and
second means for applying after said pulse a lower voltage signal for continuous wave operation.

11. The laser of claims 1, 2, 3, or 4 wherein the pressure of said gas is in the range of approximately 3 to 10 Torr.

* * * * *